(12) United States Patent
Suzuki

(10) Patent No.: US 8,048,962 B2
(45) Date of Patent: Nov. 1, 2011

(54) RESIN COMPOSITION, AND FILM, SHEET OR LAMINATE COMPRISING THE SAME RESIN COMPOSITION

(75) Inventor: Naozumi Suzuki, Ichihara (JP)

(73) Assignee: Du Pont-Mitsui Polychemicals Co., Ltd., Tokyo (JP)

( * ) Notice: Subject to any disclaimer, the term of this patent is extended or adjusted under 35 U.S.C. 154(b) by 806 days.

(21) Appl. No.: 11/916,172

(22) PCT Filed: May 31, 2006

(86) PCT No.: PCT/JP2006/311357
§ 371 (c)(1),
(2), (4) Date: Nov. 30, 2007

(87) PCT Pub. No.: WO2006/129854
PCT Pub. Date: Dec. 7, 2006

(65) Prior Publication Data
US 2010/0204406 A1    Aug. 12, 2010

(30) Foreign Application Priority Data

May 31, 2005    (JP) .................................. 2005-160302

(51) Int. Cl.
- C08L 33/02 (2006.01)
- C08L 33/04 (2006.01)
- C08L 35/02 (2006.01)
- C08L 23/00 (2006.01)
- C08L 23/04 (2006.01)
- B05D 7/00 (2006.01)
- C08J 3/00 (2006.01)

(52) U.S. Cl. ........ 525/221; 525/222; 525/240; 524/522; 524/523

(58) Field of Classification Search .................. 525/221, 525/222, 240; 524/522, 523
See application file for complete search history.

(56) References Cited

U.S. PATENT DOCUMENTS 4,373,066 A * 2/1983 Karim et al. .................. 525/133
4,387,188 A    6/1983 Statz

FOREIGN PATENT DOCUMENTS

| EP | 0255050 A2 | 2/1988 |
| JP | 3-207734 A | 9/1991 |
| JP | 5-31850 A | 2/1993 |
| JP | 9-272761 A | 10/1997 |
| JP | 2004-510871 A | 4/2004 |
| JP | 2005-187744 A | 7/2005 |

* cited by examiner

*Primary Examiner* — Nathan M Nutter
(74) *Attorney, Agent, or Firm* — Hahn & Voight PLLC; Roger C. Hahn

(57) ABSTRACT

A resin composition comprising at least one copolymer (A) selected from an ethylene/(meth)acrylic acid copolymer (A1) and an ethylene/(meth)acrylic acid/(meth)acrylic acid ester copolymer (A2), and a polyethylene (B), wherein when the total amount of (A) and (B) in the resin composition is set to be 100% by weight, the content of (A) is less than 100 to 46% by weight, the content of (B) is in excess of 0 but not larger than 54% by weight, and (A) contains 0.1 to 5% by weight of a (meth)acrylic acid unit. There are thus provided a resin composition comprising an ethylene/(meth)acrylic acid bicopolymer or an ethylene/(meth)acrylic acid/(meth)acrylic acid ester tercopolymer and a polyethylene, as well as a film or a sheet made from the resin or the resin composition, and a laminate thereof featuring high-speed workability in the extrusion lamination working, particularly excellent adhesiveness to the polar base materials, adhering little in the extrusion-molding machine, without requiring the use of a purging agent and/or a purging resin at the time of changing the kind of the resin or changing the colored lot of the resin, or requiring the purging agent and/or the purging resin in conspicuously small amounts if they are used.

19 Claims, No Drawings

RESIN COMPOSITION, AND FILM, SHEET OR LAMINATE COMPRISING THE SAME RESIN COMPOSITION

TECHNICAL FIELD

The present invention relates to a resin composition comprising an ethylene/(meth)acrylic acid copolymer and/or an ethylene/(meth)acrylic acid/(meth)acrylic acid ester copolymer and a polyethylene, to a resin composition comprising the above resin components further blended with an ethylene/(meth)acrylic acid ester copolymer, and to a film, a sheet or a laminate comprising the above copolymer resin or the resin composition.

BACKGROUND ART

The ethylene/(meth)acrylic acid copolymer resin and the ethylene/(meth)acrylic acid/(meth)acrylic acid ester copolymer resin, contain polar groups in the molecular chains thereof and adhere excellently to a metal such as aluminum or to any other resins having polar groups, such as nylon and polyester. The above resins further have excellent heat-sealing property and hot-tacking property in addition to toughness and flexibility. Therefore, the above resins have heretofore been used chiefly as sealant resins or adhesive resins such as laminate films or sheets, i.e., have been much used as stretch films for wrapping, like materials for packing candies and sweets, foamed polystyrene trays, and as materials for the paper containers for juices, liquors, etc., for the containers for bathing agents, for the containers for poultices and for the laminated tubes for toothpastes.

The formed articles such as the above laminated films can be, usually, produced by the line-forming such as extrusion coating/extrusion lamination by using an extruder.

Therefore, the high-speed workability (DD property, NI, etc.) of the starting resins greatly affects the productivity of the products, i.e., the cost of the products. However, the high-speed workability of the resins of these kinds is considerably poorer than that of the general-purpose low-density polyethylenes, and it has been strongly urged improve the workability.

In order to improve the high-speed workability, JP-T-2004-510871 proposes a resin composition obtained by selecting an ethylene/(meth)acrylic acid copolymer or an ethylene/(meth)acrylic acid/(meth)acrylic acid ester copolymer having a relatively small acid unit content, and blending about 5 to 45% by weight thereof with about 95 to 55% by weight of a low-density polyethylene.

The above resin composition surely improves the high-speed workability to some extent and, therefore, helps increase the productivity correspondingly but cannot strongly adhere to certain kind of polar base materials such as nylon base materials and, often, fails to reach a practicable limit strength. Therefore, limitation is imposed on its use.

In addition to the above problem, further, when a resin containing polar groups such as acid groups like the above copolymer resin is melt-extruded for extended periods of time, the resin adheres and stays in the resin flow passage of the extruder, and is partly gelled, deteriorated or decomposed producing stripes in the products, or causing gels or lumps to be mixed into the products resulting in the production of defective products. Further, when the operation of the melt-extruder is started again after the operation thereof has once been stopped, gelled and decomposed products of the resin in the resin flow passage are discharged over extended periods of time. Therefore, a tremendous period of time and products are wasted until normal products are obtained after the restart of the apparatus.

In the field of modern plastic molding, it is a trend to produce an ever increased kinds of products in ever decreased amounts, changing colors of the resins to be molded or changing the kinds of the resins more frequently then ever before.

In this case, for example, when the color or the resin is to be changed by using a blow-molding machine, a tainted contaminant due to the preceding resin remains in the seam portion that is joined when a hollow cylinder is formed in a parison fitted in the extruder. The contaminant due to the preceding resin cannot be easily removed, and deteriorates the appearance and physical properties of the molded articles.

In order to solve the above problems, a method has heretofore been employed according to which the interior of the resin flow passage in the molding machine such as the extruder is substituted with a purging agent which is obtained by blending a resin such as a high-density polyethylene, a low-density polyethylene, a straight-chain low-density polyethylene, a polystyrene or a polypropylene, or a mixture of resins thereof with a surfactant or an inorganic filler.

For example, Japanese Patent No. 3568327 discloses a purging composition obtained by blending a hydrophobic thermoplastic resin such as a polyolefin resin, a hydrophilic thermoplastic resin such as an ethylene/vinyl alcohol copolymer, and a crystal water-containing compound such as a hydrated calcium chloride in amounts of particular ratios.

Further, JP-A-3-207734 discloses a washing composition obtained by blending a polyolefin resin and a polymethyl methacrylate resin with one or two of a neutral salt of an organic sulfonic acid, basic magnesium carbonate, aluminum hydroxide or zinc carbonate in amounts of a predetermined ratio.

DISCLOSURE OF THE INVENTION

In molding an ethylene/(meth)acrylic acid copolymer resin or an ethylene/(meth)acrylic acid/(meth)acrylic acid ester copolymer resin which contains polar groups in the molecular chains thereof and adheres more favorably to a metal than a polyolefin resin, when it is attempted to change the color of the resin or to change the colored lot, it becomes necessary to clean the resin passage of the extruder by feeding the purging agent into the extruder, consuming the purging agent in large amounts each time and interrupting the molding operation for extended periods of time.

For example, in molding the ethylene/(meth)acrylic acid copolymer resin or the ethylene/(meth)acrylic acid/(meth) acrylic acid ester copolymer resin through a T-die film-forming machine based on an extruder of 90 mmϕ, when it is attempted to change the kind of the resin, it is necessary to use about 25 kg of the purging agent and at least not less than 50 kg of the low-density polyethylene resin having an MFR of 3 to 5 in a standard purging operation.

Therefore, the advent of the ethylene/(meth)acrylic acid copolymer resin or the ethylene/(meth)acrylic acid/(meth) acrylic acid ester copolymer resin has long been strongly desired without using large amounts of purging agent and extended periods of purging after every change of the kind of the resin or after every change of the colored lot.

In many cases, so far, the resins of this kind have been used as a laminate for adhesion to a metal material such as aluminum. Conflicting problems must be solved for imparting such properties that the resin closely adheres to an aluminum foil or the like but does not adhere to the metallic molding machine though the metal species, adhering conditions and environments may not be the same. It is not easy to solve the above problem, and the ethylene/(meth)acrylic acid copolymer resin or the ethylene/(meth)acrylic acid/(meth)acrylic acid ester copolymer resin having the above properties has not been realized yet so far.

The present inventors have conducted a keen study in an attempt to solve the above difficult problem, have found that the above problem can be cleared by a blended resin composition which lies in a particular copolymer composition range and which is, preferably, obtained by blending an ethylene/(meth)acrylic acid copolymer resin or an ethylene/(meth)acrylic acid/(meth)acrylic acid ester copolymer that exhibits a particular melt viscoelasticity when molded being fluidized, with a polyethylene in amounts of a particular ratio, and have completed the invention based on the above knowledge.

It is therefore an object of the present invention to provide a resin composition comprising an ethylene/(meth)acrylic acid copolymer or an ethylene/(meth)acrylic acid/(meth)acrylic acid ester copolymer and a polyethylene, which maintains a sufficient degree of adhesiveness to metals such as aluminum and the like as well as to other resins having polar groups, such as polyamide, polyester and the like, but adheres little in the molding machine, and obviates the need of using the purging agent or enables the amount of its use to be decreased to a conspicuous degree, making it possible to greatly shorten the time for interrupting the molding.

Another object of the present invention is to provide a resin composition which can be excellently molded (molded at high speeds) as compared to the conventional general-purpose ethylene/(meth)acrylic acid copolymer resins or the ethylene (meth)acrylic acid/(meth)acrylic acid ester copolymer resins, and makes it possible to markedly improve the productivity as compared to the conventional products.

A further object of the present invention is to provide a film or a sheet by molding the above particular bi- or tercopolymer resin, or the above particular resin composition.

A still further object of the present invention is to provide a laminate by laminating at least a layer of the film or the sheet, and a laminate obtained by extrusion-laminating the above particular copolymer resin or the resin composition onto a base material.

According to the present invention, there is provided a resin composition comprising at least one copolymer (A) selected from an ethylene/(meth)acrylic acid copolymer (A1) and an ethylene/(meth)acrylic acid/(meth)acrylic acid ester copolymer (ethylene/(meth)acrylic acid/(meth)acrylate ester copolymer) (A2), and a polyethylene (B), wherein when the total amount of (A) and (B) in the resin composition is set to be 100% by weight, the content of (A) is less than 100 to 46% by weight, the content of (B) is more than 0, to 54% by weight, and (A) contains 0.1 to 5% by weight of a (meth)acrylic acid unit. In the present invention, the "(meth)acrylic acid" means ① an acrylic acid, ② a methacrylic acid or ③ an acrylic acid and a methacrylic acid. As the ethylene/(meth)acrylic acid copolymer, there can be exemplified an ethylene/acrylic acid copolymer or an ethylene/methacrylic acid copolymer. As the ethylene/(meth)acrylic acid/(meth)acrylic acid ester copolymer, there can be exemplified an ethylene/methacrylic acid/acrylate ester copolymer, an ethylene/acrylic acid/methacrylate ester copolymer.

The resin composition of the present invention has a distinguished feature in that the ethylene/(meth)acrylic acid copolymer or the ethylene/(meth)acrylic acid/(meth)acrylic acid ester copolymer contains the (meth)acrylic acid unit in an amount smaller than the amount which is usually possessed by the copolymer resins of this kind, and that the resin composition is blended with the polyethylene in a relatively small amount at a particular ratio.

The above resin composition of the present invention exhibits excellent adhesiveness to other resin substrate having polarity, such as polyester, nylon and the like, maintains sufficient degree of adhesiveness even to metallic base materials such as aluminum foil and the like, and makes it possible to greatly decrease the amount of use of the purging agent at the time of changing the kind of the resin as compared to the existing resins of this kind.

Besides, the resin composition of the invention is excellent in high speeds processibility (excellent DD (draw-down) property and NI (neck-in)) as compared to the conventional ethylene/(meth)acrylic acid copolymer resins or the ethylene (meth)acrylic acid/(meth)acrylic acid ester copolymer resins, and makes it possible to markedly improve the productivity.

In the resin composition of the present invention, it is desired that the content of the copolymer (A) is 99 to 46% by weight and the content of the polyethylene (B) is 1 to 54% by weight and, particularly, the content of (A) is 75 to 50% by weight and the content of (B) is 25 to 50% by weight per the total amount (100% by weight) of the copolymer (A) and the polyethylene (B).

It is desired that the ethylene (meth)acrylic acid/(meth)acrylate acid ester copolymer (A2) contains the (meth)acrylic acid ester unit in an amount of 0.3 to 25% by weight.

It is further desired that the copolymer (A1) or (A2) has a swelling ratio (SR) defined by the following formula (I) in a range of 40 to 65%, $$SR=(d_s-d_0)/d_0 \times 100 \qquad (1)$$

where $d_s$ is a diameter of a resin strand flowing out from a melt indexer under a load of 2160 g and at 190° C., and
$d_0$ is a diameter of orifice of the melt indexer.

It is further desired that a melt flow rate thereof (MFR: JIS K-7210-1999 (190° C., load of 2160 g)) is in a range of 1 to 200 g/10 min., and, particularly, the swelling ratio (SR) is in a range of 40 to 65%. It is most desired to use the copolymer having a melt flow rate (MFR) in a range of 1 to 40.

It is further desired that the (meth)acrylic acid ester unit in the copolymer (A2) is an alkyl(meth)acrylate ester unit having 1 to 10 alkyl group carbon atoms.

It is further desired that the polyethylene (B) is a low-density polyethylene having a density of 0.900 to 0.930 g/cm³.

In the present invention, it is particularly desired that the resin composition, further, contains an ethylene/(meth)acrylic acid ester copolymer (C) as a resin component, and when the total amount of (A), (B) and (C) is set to be 100% by weight, the content of (C) is not more than 40% by weight.

The resin composition of the above embodiment which is further blended with the ethylene/(meth)acrylic acid ester copolymer (C) in a particular amount exhibits further improved adhesiveness to the resin base materials such as polyethylene terephthalate (PET) and stretch-oriented polypropylene, as well as to metallic base materials such as aluminum foil and the like, and exhibits markedly improved processability at the time of lamination.

In the present invention, it is desired that the resin composition contains the component (C) in an amount of 5 to 30% by weight per the total amount of (A), (B) and (C), and, particularly, contains the component (A) in an amount of 50 to 75% by weight, the component (B) in an amount of 1 to 40% by weight and the component (C) in an amount of 5 to 30% by weight (where (A)+(B)+(C)=100% by weight).

It is desired that the ethylene/(meth)acrylic acid ester copolymer (C) contains the (meth)acrylic acid ester unit ((meth)acrylate ester unit) in an amount of 1 to 35% by weight.

It is desired that the (meth)acrylic acid ester unit in (C) above is an alkyl(meth)acrylate ester unit having 1 to 10 alkyl group carbon atoms.

According to the present invention, there is further provided a film or a sheet obtained by molding a resin composition comprising at least one ethylene copolymer (A) selected from an ethylene/(meth)acrylic acid copolymer (A1) containing 0.1 to 5% by weight of a (meth)acrylic acid unit and an ethylene/(meth)acrylic acid/(meth)acrylic acid ester copolymer containing 0.1 to 5% by weight of the (meth)acrylic acid unit, or comprising the above ethylene copolymer (A) and a polyethylene (B), the content of (A) being less than 100% by weight to 46% by weight and the content of (B) being more than 0% by weight, to 54% by weight.

According to a preferred embodiment of the film or the sheet, further, the film or the sheet is provided by molding the resin composition which, further, contains the ethylene/(meth)acrylic acid ester copolymer (C), wherein when the total amount of (A), (B) and (C) is set to be 100% by weight, the content of (C) is not larger than 40% by weight.

The film or the sheet of the above preferred embodiment is constituted by the resin composition which comprises the above component (A), or the component (A) and the component (B) further containing the ethylene/(meth)acrylic acid ester copolymer (C) wherein, when the total amount of (A), (B) and (C) is set to be 100% by weight, the content of (C) is not larger than 40% by weight.

According to the present invention, there are, further, provided a laminate obtained by laminating at least a layer of the film or the sheet, and a laminate obtained by extrusion laminating, on a base material, a resin composition comprising at least a copolymer (A) selected from an ethylene/(meth)acrylic acid copolymer (A1) which contains 0.1 to 5% by weight of a (meth)acrylic acid unit and an ethylene/(meth)acrylic acid/(meth)acrylic acid ester copolymer (A2) which contains 0.1 to 5% by weight of the (meth)acrylic acid unit, and a polyethylene (B), the content of (A) being less than 100% by weight to 46% by weight, and the content of (B) being more than 0% by weight, to 54% by weight.

It is desired that the resin composition constituting the layers of the laminate comprises (A), (B) and, further, the ethylene/(meth)acrylic acid ester copolymer (C), wherein when the total amount of (A), (B) and (C) is set to be 100% by weight, the content thereof is not larger than 40% by weight.

In the resin composition of the present invention, the ethylene/(meth)acrylic acid copolymer resin or the ethylene/(meth)acrylic acid/(meth)acrylic acid ester copolymer resin which is the chief constituent resin is the one that contains the (meth)acrylic acid unit in an amount smaller than the amount that is usually used for the copolymer resins of this kind. Besides, in the case of the ethylene/(meth)acrylic acid/(meth) acrylic acid ester copolymer resin, the content of the (meth) acrylic acid ester unit is selected to lie in a particular range. Preferably, the chief constituent resin has a particular melt viscoelasticity when molded being fluidized and is, further, blended with a polyethylene in a relatively small amount at a particular ratio. Therefore, the resin composition exhibits excellent properties inherent in the copolymers of this kind, i.e., exhibits toughness, resistance against low-temperature shocks, flexibility, light resistance, packing adaptability, as well sufficient degree of adhesiveness to metal base materials such as aluminum foil and the like and other resin substrates having polarity, such as polyethylene terephthalate and nylon, obviating the need of using a purging agent, and can be cleaned by simply flowing a low-density polyethylene in small amounts or making it possible to greatly decrease the amount of use of the purging agent if the purging agent is used.

Besides, the resin composition of the invention is excellent in molding processability (high speed processability) as compared to the conventional general-purpose ethylene/(meth) acrylic acid copolymer resins or the ethylene(meth)acrylic acid/(meth)acrylic acid ester copolymer resins, and makes it possible to markedly improve the productivity.

In particular, the composition which is further blended with the ethylene/(meth)acrylic acid ester copolymer in a particular amount exhibits further improved adhesiveness to the base material and features conspicuously excellent processability (draw-down property, neck-in property) during the molding.

Further, the film or the sheet obtained by molding the above resin or the resin composition exhibits excellent adhesiveness to the base material as well as excellent heat-sealing property and hot-tacking property in addition to toughness and flexibility, and is useful as a sealant resin film or an adhesive resin film for forming laminated film sheets.

The laminate including the above resin layer or the resin composition layer exhibits excellent interlayer adhesiveness and excellent resistance against hot water.

BEST MODE FOR CARRYING OUT THE INVENTION

An embodiment of the invention will now be described in detail and concretely.

[Ethylene/(Meth)Acrylic Acid Copolymer (A1) and/or Ethylene/(Meth)Acrylic Acid/(Meth)Acrylic Acid Ester Copolymer (A2)]

The resin composition of the present invention uses, as constituent components thereof, at least a copolymer (A) selected from an ethylene/(meth)acrylic acid copolymer and/ or an ethylene/(meth)acrylic acid/(meth)acrylic acid ester copolymer, which contains a (meth)acrylic acid unit in an amount in a particular range lower than the range which is usually employed for the copolymer resins of this kind.

That is, the copolymer (A) of the present invention contains the (meth)acrylic acid unit in an amount of 0.1 to 5% by weight, more preferably, 0.5 to 4.0% by weight and, particularly preferably, 1.0 to 3.0% by weight.

In the present invention, the content of the (meth)acrylic acid unit in the ethylene copolymer is measured according to an FT-IR method. In the present invention, when a mixture of two or more kinds selected from (A1) and/or (A2) is used, the average (meth)acrylic acid unit content may lie in a range of 0.1 to 5% by weight.

If the content of the (meth)acrylic acid unit is more than the above limit, compatibility decreases relative to the polyethylene impairing the high-speed processability. Besides, adhesion on the resin flow passage of the extruder cannot be decreased down to a satisfactory degree during the molding and, therefore, the amount of use of the purging agent cannot be decreased down to a desired level.

If the content of the (meth)acrylic acid unit is smaller than the above limit, the obtained composition exhibits low adhesiveness, cannot be adhered to a sufficient degree to metal foils such as of aluminum or to other resins such as nylon or polyester. Besides, elongation stress of the layer thereof drops after applied/laminated.

In the present invention, more preferable copolymer of (A) is copolymer (A2). The (meth)acrylic acid ester unit in the copolymer (A2) works chiefly to reinforce the adhesive affinity of the copolymer to other resins.

In the present invention, it is desired that the amount of the (meth)acrylic acid ester unit is in a range of 0 to 25% by weight, preferably, 0.1 to 25% by weight and, particularly, 0.3 to 25% by weight by taking the adhesiveness to OPET (stretched oriented polyethylene terephthalate) and OPA (stretched oriented polyamide) into consideration.

If the content of the (meth)acrylic acid ester unit exceeds the above limit, stickiness increases at the time of extrusion lamination deteriorating the workability which is not desirable.

It is essential that the copolymer (A) of the present invention has a copolymer composition lying in the above range. It is, further, desired that the copolymer having the above composition is particularly the one which exhibits a specific melt viscoelasticity when formed being fluidized, i.e., has a swelling ratio (SR) which is an index of melt elasticity and a melt flow rate (MFR) which is an index of melt viscosity lying in particular ranges.

Therefore, the resin composition of the invention obtained by blending the above copolymer with the polyethylene exhibits all of excellent properties of the conventional copolymer of this kind, contributes to attain high-speed workability, eliminates the need of using the purging agent, and can be cleaned by simply passing a low-density polyethylene in small amounts or makes it possible to greatly decrease the amount of the purging agent if it is used.

The noncrosslinked high molecular molten fluid such as the thermoplastic resin is a typical viscoelastic fluid and exhibits an inherent melt elasticity and viscosity depending upon the fluidized conditions (shearing rate, temperature).

Among them, the melt viscosity is expressed as an index representing a swelling ratio $[SR=(d_s-d_0)/d_0 \times 100$, where $d_s$ is a diameter of a resin strand flowing out from a melt indexer under a load of 2160 g and at 190° C., and $d_0$ is a diameter of orifice of the melt indexer] based on the so-called Barus effect.

The Barus effect stands for that the outer diameter of the extruded melt swells into a size larger than the orifice diameter at the time when the molten viscous fluid is extruded from the orifice. This is a phenomenon stemming from a change in the stress in a direction (direction of normal) at right angles with the flow of the high molecular viscous melt from the orifice.

In general, it has been said that the speed of workability increases with a decrease in the swelling ratio (SR).

On the other hand, the melt flow rate (MFR) is an index representing the fluidity (inverse of viscosity) and it is generally considered that the fluidity and workability when being melted are improved as the value of melt index increases. However, the melt flow rate (MFR) is also considered as an indirect index of an average molecular weight of high molecules constituting the resin, and the tensile strength and resistance against the stress cracking decrease as the MFR value increases.

Under the same fluidized conditions (shearing rate, temperature), it has been known that the swelling ratio (SR) increases with an increase in the width of molecular weight distribution or with an increase in the long-chain branches in the molecules. The swelling ratio can be adjusted to some degree by adjusting, for example, the polymerizing conditions such as the composition, temperature, pressure, concentration of the polymerization initiator and solvent.

Therefore, the polymers having the same melt flow rate (MFR) do not necessarily have the same swelling ratio (SR), as a matter of course.

In the present invention, therefore, it is desired that the ethylene/(meth)acrylic acid copolymer (A1) and the ethylene/(meth)acrylic acid/(meth)acrylic acid ester tercopolymer (A2), exhibit particular melt flow viscoelasticities and, further, exhibit the ratio SR in a range of 40 to 65% and, more preferably, 45 to 60%.

It is further desired that the at least one ethylene copolymer selected from the copolymers (A1) and (A2) has an MFR of 1 to 500 g/10 min., preferably, 1 to 200 g/10 min., more preferably, 1 to 40 g/10 min., and most preferably, 2 to 30 g/10 min.

In the present invention, in particular, it is most desired that the ethylene copolymer has an SR of 45 to 60% and an MFR of 2 to 30 g/10 min.

In the present invention, the melt flow rate (MFR) of the ethylene copolymer (A) such as the copolymer (A1) or (A2) is measured in compliance with the JIS K-7210-1999 (190° C., load of 2160 g).

Therefore, as described already, the high-speed processability such as DD (draw-down) property and NI (neck-in) under the conditions of forming the composition can be improved to approach that of the polyethylene resin. Besides, adhesion in the extruder and local residence of the resin due to the adhesion can be greatly decreased. Moreover, adhesion to the base material such as aluminum foil, polyester, nylon, etc. can be maintained on a level nearly comparable to the adhesion to the copolymer resin of this kind.

In the present invention, the (meth)acrylic acid ester ((meth)acrylate ester) used for the copolymer (A2) is an alkyl (meth)acrylate ester having 1 to 10 alkyl group carbon atoms, such as methyl acrylate, ethyl acrylate, isopropyl acrylate, n-butyl acrylate, isobutylacrylate, isooctyl acrylate, methyl methacrylate, ethyl methacrylate, isopropyl methacrylate, n-butyl methacrylate, isobutyl methacrylate and isooctyl methacrylate.

Among these (meth)acrylic acid esters, it is particularly desired to use the isobutyl acrylate or the isobutyl methacrylate.

The copolymers (A1, A2) of the present invention can be obtained by directly copolymerizing the ethylene and the (meth)acrylic acid, or the ethylene, the (meth)acrylic acid and the (meth)acrylic acid ester according to a known method for producing bi- or tercopolymer resin of this kind, e.g., relying on the high-pressure free radical polymerization under the reaction conditions of a pressure of 100 to 200 MPa and a temperature of 150 to 300° C.

[Polyethylene (B)]

As the polyethylene which is the another constituent resin component in the resin composition of the invention, there can be exemplified a low-density polyethylene (LDPE), a high-density polyethylene (HDPE), a linear low-density polyethylene (LLDPE) and a metallocene catalytically polymerized polyethylene. In the present invention, however, the polyethylene means ethylene homopolymer, and ethylene copolymer containing other component (preferably α-olefin) in a small amount, for example, in an amount of less than 20% by weight (excluding, however, the copolymer (A) and the copolymer (C)).

As the α-olefin which is a copolymerizable component, there can be exemplified an α-olefin having 3 to 20 carbon atoms and, concretely, propylene, 1-butene, 1-pentene, 1-hexene, 1-octene, 1-decene, 1-dodecene, 4-methyl-1-pentene, etc.

The α-olefins may be contained in two or more kinds.

Among them, it is desired to use a low-density polyethylene resin such as the low-density polyethylene (LDPE) or the low-density ethylene/α-olefin copolymer. In particular, it is desired to use a low-density polyethylene resin having a density of 0.870 to 0.950 g/cm$^3$ and, more preferably, 0.900 to 0.930 g/cm$^3$.

The low-density polyethylene (LDPE) can be produced through known steps or can be obtained in the market.

The LDPE is usually produced through a step of high-pressure free radical polymerization.

In particular, it is desired to use the LDPE having an MFR (as measured in compliance with the JIS K7210 or the ASTM D 1238, 190° C., a load of 2160 g) of 0.1 to 100 g/10 min., preferably, 1 to 100 g/10 min. and, particularly, 4 to 15 g/10 min. Among them, it is particularly desired to use the LDPE of the extrusion lamination grade.

[Resin Composition]

Next, the resin composition of the invention will be described.

The resin composition of the invention is obtained by blending the ethylene/(meth)acrylic acid copolymer (A1) and/or the ethylene/(meth)acrylic acid/(meth)acrylic acid ester copolymer (A2) of the invention with the polyethylene (B), and has a feature in that the content of the copolymer A (A1 and/or A2) is less than 100% by weight to 46% by weight, more preferably, 99 to 49% by weight and, particularly preferably, 75 to 50% by weight, and the content of the polyethylene (B) is more than 0% by weight but up to 54% by weight, more preferably, 1 to 51% by weight and, particularly preferably, 25 to 50% by weight.

The copolymers (A1) and (A2) may be blended alone or in a mixture.

In the case of the mixture, the mixing ratio may be suitably set depending upon the object.

The blended resin composition of the invention maintains a sufficient degree of adhesiveness to the metallic base material such as an aluminum foil or to other resin base materials such as polyethylene terephthalate, nylon, etc., eliminates the need of using a purging agent, and can be cleaned in the resin passage of the extruder to a sufficient degree by simply flowing a low-density polyethylene in small amounts, or makes it possible to greatly decrease the amount of the purging agent if it is used.

If the content of the ethylene/(meth)acrylic acid copolymer (A1) and/or the ethylene/(meth)acrylic acid/(meth)acrylic acid ester copolymer (A2) is smaller than the content specified above, i.e., if the content of the copolymer (A) is smaller than the content specified above, or if the content of the polyethylene (B) exceeds the amount specified above, then the adhesiveness is not enough to the metal foil such as of aluminum or to other resins such as nylon or polyester, in particular, the laminate to which the resin composition is adhered exhibits very decreased resistance against the heat and water, and further, the high-speed workability is not so much improved but rather slightly decreases depending upon the content thereof.

Next, as a preferred embodiment of the resin composition of the invention, there can be exemplified a resin composition comprising a resin blend of (A) and (B) at the above particular blending ratio, which is further blended with an ethylene/(meth)acrylic acid ester copolymer (ethylene/(meth)acrylate ester copolymer) (C) in an amount of a particular ratio.

It is desired that the blending amount (content) of the ethylene/(meth)acrylic acid ester copolymer (C) is not more than 40% by weight and, particularly, 5 to 30% by weight when the total amount of (A), (B) and (C) is set to be 100% by weight. In particular, the resin composition comprises the component (A) in an amount of 50 to 75% by weight, the component (B) in an amount of 1 to 40% by weight and the component (C) in an amount of 5 to 30% by weight.

The resin composition of the above embodiment blended with the ethylene/(meth)acrylic acid ester copolymer (C) in a particular amount adheres more favorably to the base materials such as polyethylene terephthalate (PET), draw-oriented polypropylene (OPP) and aluminum foil (Al) than those which are not blended therewith or are blended with other resins, and further offers advantages such as high-speed processability, e.g., very improved DD property and NI at the time of forming a film or the like.

The purging performance, however, decreases if the component (C) is blended in amounts in excess of the above limit.

If the adhesiveness to the PET (polyethylene terephthalate) or the OPP (draw-oriented polypropylene) film is taken into consideration, it is desired that the ethylene/(meth)acrylic acid ester copolymer (C) contains the (meth)acrylic acid ester unit in an amount in a range of 1 to 35% by weight and, particularly, 5 to 25% by weight.

If the content of the (meth)acrylic acid ester unit exceeds the above limit, the stickiness increases and the processability decreases at the time of extrusion lamination, which is not desirable.

The component (C) desirably has an MFR (in compliance with the JIS K 7210, 190° C., load of 2160 g) in a range of 0.1 to 150 g/10 min. and, particularly, in a range of 0.5 to 150 g/10 min.

In the present invention, the (meth)acrylic acid ester used for the component (C) is a (meth)acrylate alkyl ester having 1 to 10 alkyl group carbon atoms, such as methyl acrylate, ethyl acrylate, isopropyl acrylate, n-butyl acrylate, isobutyl acrylate, isooctyl acrylate, methyl methacrylate, ethyl methacrylate, isopropyl methacrylate, n-butyl methacrylate, isobutyl methacrylate and isooctyl methacrylate.

Among these (meth)acrylic acid esters, it is particularly desired to use the methyl acrylate.

As the above copolymer (C) of the invention, there can be used any copolymer of the ethylene and the (meth)acrylic acid ester, such as the one obtained by copolymerizing the ethylene and the (meth)acrylic acid ester by the high-pressure free radical polymerization according to a known method of producing the copolymer resins of this kind. Among them, according to the present invention, it is particularly desired to use the one produced by a multi-stage polymerization in an autoclave or by the polymerization in a tubular reactor (see, for example, Japanese Patent No. 3423308, JP-A-62-273214).

The ethylene/(meth)acrylic acid ester copolymer produced by the above method has a relationship between the melting point of the copolymer (T: JIS K 7121) as measured by the differential scanning calorimetric method (DSC) and the (meth)acrylic acid ester unit content (X: mol %) as represented by the following formula (1), and has a melting point slightly higher than that of the polymer having the same composition obtained by any other copolymerization method.

That is, as compared to the copolymers produced by an ordinary method, the above copolymer has the ethylene unit and the (meth)acrylic acid ester unit that are arranged in a less random fashion, and possesses the structure and properties close to the block copolymer.

$$-3.0X+125 \geq T \geq -3.0X+109 \quad (1)$$

Next, to prepare the resin composition of the present invention, the above copolymer ((A) or (A) and (C)) and the polyethylene (B) may be melted and blended at a suitable temperature which may be, for example, about 120 to about 250° C., or pellets of the copolymer and the polyethylene may be blended together and may be introduced into a hopper of a coating/laminating extruder prior to extrusion-coating/laminating them by using a monoaxial screw extruder, a biaxial screw extruder or any other blender known in the art.

In addition to the above component, the resin composition of the present invention may be blended with an antioxidant, a lubricating agent, an anti-blocking agent, a heat stabilizer, an antistatic agent, a workability reformer and a coloring agent that have been known per se. as arbitrary components.

[Formed Film, Sheet and Laminate]

Next, described below are formed articles such as a film or a sheet made from the above copolymer resin or the resin composition ((A), (A)+(B), (A)+(B)+(C)), a laminate (laminated body) constituted by the above film or the sheet, and a laminated body obtained by extrusion-laminating the above resin or the resin composition onto the base material.

The resin and the resin composition of the present invention can be formed into various shapes by an extrusion-forming, an injection-forming, a blow-forming or a film- or sheet-forming method.

Among them, forming a film or a sheet is desired for enabling the resin of the invention to exhibit its properties to a sufficient degree. The film or sheet can be formed by using, for example, an inflation-forming machine or a cast film/sheet-forming machine. The obtained film or sheet can be used as a single layer but can also be laminated on various base materials to obtain laminates (laminated articles) of laminated films or sheets.

The laminated films and sheets can be formed by a dry lamination method, a wet lamination method or an extrusion lamination method. In order for the resin of the invention to exhibit its properties more favorably, however, the extrusion lamination is most desired also compounded by the advantages of production cost and production efficiency.

As the base materials, there can be exemplified a drawn or undrawn film such as polyester film (PET), polyamide film (Ny), polypropylene film (PP), or ethylene/vinyl alcohol copolymer (EVOH), a paper, a nonwoven fabric, an aluminum foil (Al), an aluminum-deposited polyester film (Al-metallized PET), a silica-deposited polyester film (silica-metallized PET), and an alumina-deposited polyester film (alumina-deposited PET).

Further, the laminated films/sheets will have the following layer constitutions:

PE (polyethylene) layer/paper/resin (resin composition) layer of the invention/Al layer/PE layer;

PET layer/resin (resin composition) layer of the invention/Al foil/sealant layer;

Paper/resin (resin composition) layer of the invention/Al foil/sealant layer;

Ny layer/resin (resin composition) layer of the invention/PE layer;

PET layer/resin (resin composition) layer of the invention/Al-metallized PET layer/PE layer; and OPP (draw-oriented polypropylene) layer/resin (resin composition) layer of the invention/PE layer/PET layer.

However, the constitution of lamination is not limited to the above examples only.

Further, though not particularly limited, the thickness of the resin (resin composition) layer of the invention in the laminated films or sheets is, desirably, 3 to 50 μm and, particularly, 5 to 40 μm.

The laminates of films or sheets of the invention constituted by the layers of the resin or resin composition of the invention can be used as paper container materials for containing juices and liquors, packing materials for packing various candies and sweets, wrapping stretchable film materials for wrapping foamed polystyrene tray, etc., packing materials for packing daily dishes, cooked foods and processed foods, container materials for bathing agents, packing container materials for poultices, laminated tube materials for toothpastes, liquid packing materials for packing soy source, source and soup, and lid materials for various containers.

EXAMPLES

The invention will now be concretely described by way of the following Examples to which only, however, the invention is in no way limited.

1. [Evaluated Resins]

Resin [1]: Ethylene/methacrylic acid/isobutyl acrylate copolymer.
  Composition: Methacrylic acid unit; 2.3% by weight, isobutyl acrylate unit; 5.7% by weight, the remainder being the ethylene unit.
  Properties: MFR=8 g/10 min., density 0.930 g/cm$^3$, SR 54%.

Resin [2]: Ethylene/methacrylic acid copolymer.
  Composition: Methacrylic acid unit; 9% by weight, the remainder being the ethylene unit.
  Properties: MFR=8 g/10 min., density 0.930 g/cm$^3$.

Resin [3]: Low-density polyethylene [LDPE].
  Properties: MFR=4.5 g/10 min., density 0.923 g/cm$^3$.

Resin [4]: Composition obtained by melting and kneading the resin [1] and the resin [3] in advance at a weight ratio of 75 to 25.

Resin [5]: Composition obtained by melting and kneading the resin [1] and the resin [3] in advance at a weight ratio of 60 to 40.

Resin [6]: Composition obtained by melting and kneading the resin [1] and the resin [3] in advance at a weight ratio of 50 to 50.

Resin [7]: Composition obtained by melting and kneading the resin [1] and the resin [3] in advance at a weight ratio of 25 to 75.

Resin [8]: Ethylene/methyl acrylate copolymer.
  Composition: Methyl acrylate unit; 20% by weight, the remainder being the ethylene unit.
  Properties: MFR=8 g/10 min., density 0.942 g/cm$^3$, m.p., 92° C.

Resin [9]: Composition obtained by melting and kneading the resin [1], the resin [3] and the resin [8] in advance at a weight ratio of 60/30/10.

Resin [10]: Composition obtained by melting and kneading the resin [1], the resin [3] and the resin [8] in advance at a weight ratio of 60/20/20.

Resin [11]: Composition obtained by melting and kneading the resin [1] and the resin [8] in advance at a weight ratio of 60/40.

The resins [1], [2], [3] and [8] were measured for their MFRs in compliance with the JIS K 7210-1999 (190° C., load of 2160 g). The resins [4] to [7] and [9] to [11] were melted and kneaded at a temperature of 160° C.

2. [Apparatus for Evaluation]
  Extrusion-coating apparatus: 65 mm φ, L/D=28.
  Screw: 3-stage type, groove depth ratio=4.8.
  Die: 900 mm wide, inner Deckel type.

3. [Method of Evaluation]

3.1. Evaluation of the Purging Property.

After a resin to be evaluated was extrusion-formed in an amount of not less than 25 kg, the LDPE (MFR=3.6 g/10 min., density=0.923 g/cm$^3$) was extruded as a purging agent at a screw rotational speed of 200 rpm, and the appearances of the molten films flowing out from the die were observed and compared.

3.2. Evaluation of the Workability.

1) Neck-In (NI: mm).

The neck-in width was found according to the following formula when a resin was extrusion-laminated onto a craft paper, the resin being extruded maintaining a thickness of 20 μm from a die opening of 500 mm wide at a take-up speed of 80 m/min., Neck-in=500−width of when laminated (mm)

2) Draw-Down (DD: m/min.).

The amount of extrusion at the time of measuring the neck-in was set to be constant, the take-up speed was gradually increased, and a take-up speed was measured at a moment when the selvage of the molten film started swinging.

3.3. Evaluation of the Adhering Strength.

1) Constitutions of the Laminates Used for the Evaluation.

Constitution 1 (for evaluating the adhesion to PET) PET/resin to be evaluated/LDPE/PET Constitution 2 (for evaluating the adhesion to Al) PET/PE/Al/resin to be evaluated/LDPE/PET Constitution 3 (for evaluating the adhesion to Ny) Ny/resin to be evaluated/LDPE/PET Constitution 4 (for evaluating the boiling resistance) Ny/resin to be evaluated/LLDPE Constitution 5 (for evaluating the adhesion to OPP) OPP/resin to be evaluated/LDPE/PET In the above constitutions, the underlined portions (LDPE/PET) had been laminated in advance by using an anchor coating agent, and were delivered from the side of a second delivering machine so as to be sandwich-laminated.

Referring to the constitution 2, further, the PET/PE/Al had also been laminated in advance and were used as a base material for evaluating the adhesion to Al The following base materials were used.

PET (polyethylene terephthalate), Toray Co., Lumirror, 12 μm biaxially stretched film.

Ny (nylon), Unitika Co., Emblem, 15 μm biaxially stretched film.

Al (aluminum foil), Sun Aluminum Kogyo Co., 7 μm soft aluminum.

LLDPE (linear low-density polyethylene), Tohcello Co, TUX-MCS, 40 μm thick.

OPP (stretch-oriented polypropylene), Tohcello Co., U-1, 20 μm biaxially stretched film.

2) Laminate-Working Conditions.

Thicknesses of the resin to be evaluated: 10 μm and 15 μm

Working speed: 120 m/min.

Resin temperature: 320° C. to 321° C. (workability of the resin [B] was evaluated at 290° C.)

Working width: 500 mm

Surface treatment: in-line corona treatment of the PET surface (treating intensity, 6 kw)

3) Measuring Conditions.

Peeling angle: 90 degrees (T-type peeling)

Peeling speed: 300 mm/min.

Width of test piece: 15 mm

Reference Example 1

The above resin [1](ethylene/methacrylic acid/isobutyl acrylate copolymer resin) was evaluated for its purging property after extrusion-formed by a method described below.

The resin [1] was extruded in an amount of 25 kg at a resin temperature of 320° C. to 321° C. After the resin [1] in the starting material hopper was completely emptied, the low-density polyethylene (LDPE) having an MFR=3.6 g/10 min. and a density of 0.923 g/cm$^3$ was extruded at a screw rotational speed of 200 rpm to observe the appearance of the molten film.

After the LDPE was extruded in an amount of 50 kg, the molten film became generally favorable though there remained irregular feeling to some extent. After the LDPE was extruded in an amount of 75 kg, the molten film became free of irregular feeling and was accompanied by no foreign matter indicating that the purging was completed.

The results were as shown in Table 1.

Examples 1 to 3

Evaluation was made by the same method as that of Reference Example 1 but using the resins [4], [5] and [6].

The results were as shown in Table 1.

Comparative Example 1

After the resin [2] (ethylene/methacrylic acid copolymer: methacrylic acid unit, 9% by weight) was extruded in an amount of 25 kg at a resin temperature of 290° C., the LDPE was extruded at a screw rotational speed of 200 rpm while elevating the temperature to 320° C. and was evaluated by the same method as that of Reference Example 1.

Even after the LDPE was extruded in an amount of 100 kg, the irregular feeling remained and the purging was not completed. Therefore, a dedicated purging agent was used and, besides, the LDPE was used in an amount of another 25 kg to purge the purging agent to thereby complete the purging.

The results were as shown in Table 1.

Comparison with Examples 1 to 3 tell that the purging property was obviously favorable in the case of the Examples.

TABLE 1

| Resin | Appearance of molten film after extruding 25 kg of LDPE | Appearance of molten film after extruding 50 kg of LDPE | Appearance of molten film after extruding 75 kg of LDPE |
|---|---|---|---|
| Ref. Ex. 1 (resin [1]) | X | Δ | ○ |
| Example 1 (resin [4]) | Δ | ○ | — |
| Example 2 (resin [5]) | Δ~○ | ○ | — |
| Example 3 (resin [6]) | ○ | — | — |

TABLE 1-continued

| Resin | Appearance of molten film after extruding 25 kg of LDPE | Appearance of molten film after extruding 50 kg of LDPE | Appearance of molten film after extruding 75 kg of LDPE |
|---|---|---|---|
| Comp. Ex. 1 (resin [2]) | XX | XX | X |

Appearance of molten films:
○ Quite free of problem and favorable.
Δ Slight irregular feeling with scattering tiny lumps.
X Strong irregular feeling with many small lumps.
XX Very strong irregular feeling entirely crawling with large and small lumps.

Reference Example 2

Laminates of the above-mentioned layer constitutions 1, 2 and 3 were prepared by using the resin [1] and were evaluated for their interlayer adhering strength to the substrates (PET, Al foil, Ny) and their processability relying on the above-mentioned methods.

The adhering strengths were measured by preparing the laminated films using resins to be evaluated in a thickness of 10 μm and after having left them to stand at 23° C. for 4 days.

Practicable adhering strengths were obtained for various base materials, the draw-down was 300 m/min, and the nick-in was 43 mm and without problem being comparable to that of general-purpose resins.

The workabilities and the adhering strengths were as shown in Table 2.

Examples 4 and 5

The adhering strengths to various base materials and the workabilities were evaluated in the same manner as in Reference Example 2 but using the resin [4](Example 4) and the resin [6] (Example 5).

The results were as shown in Table 2.

Comparative Examples 2 and 3

The adhering strengths to various base materials and the workabilities were evaluated in the same manner as in Reference Example 2 but using the resin [7](Comparative Example 2) and the resin [3](Comparative Example 3).

The results were as shown in Table 2.

Comparison with Reference Example 2 and Examples 4 and 5 tells that the resin [3] used in Comparative Example 3 apparently lacked adhering strength while the resin [7] used in Comparative Example 2 exhibited practicable adhering strength to some base materials but exhibited very inferior draw-down property.

Comparative Example 4

The resin [2] was evaluated for its workability at an optimum resin temperature of 290° C.

The draw-down property was sufficient meeting the general commercial production speed but was not still sufficient for the commercial production of thin films at a low cost aimed at lowering the cost of packing.

The results were as shown in Table 2.

TABLE 2

| | Adhering strength N/15 mm | | | Workability | |
|---|---|---|---|---|---|
| | | | | Draw-down | Neck-in |
| | PET | Al foil | Ny | m/min. | mm |
| Ref. Ex. 2 (Resin [1]) | 6.2* | 4.4 | 3.4 | 300 | 43 |
| Example 4 (Resin [4]) | 7.3* | 5.0* | 3.4 | 300 | 46 |
| Example 5 (Resin [6]) | 5.4 | 4.4* | 2.6 | 270 | 41 |
| Comp. Ex. 2 (Resin [7]) | 4.1 | 2.3 | 1.6 | 160 | 32 |
| Comp. Ex. 3 (Resin [3]) | 0.8 | 1.2 | 0.4 | 380 | 42 |
| Comp. Ex. 4 (Resin [2]) | not evaluated | not evaluated | not evaluated | 220 | 45 |

Peeling: A mark * indicates that the peeling occurred between the base material and, further, from the PE (polyethylene) on the opposite side.

Reference Example 3

A sandwich-laminated film of the constitution 4 (Ny/resin [A]/LLDPE) was formed under the above-mentioned working conditions and was evaluated for its boiling resistance according to the method of evaluation described below.

The resins evaluated possessed thicknesses of 10 μm and 15 μm.

Method of Evaluation.

By using a laminated film, a four side-sealed bag was prepared in a size one-eighth of A4. Water in an amount of 20 ml was sealed in the bag which was, then, immersed in a constant-temperature water vessel at a temperature of 85° C. for 30 minutes. Thereafter, the bag was taken out and was left to stand at room temperature for 2 to 3 hours to test the adhering strength between the Ny and the resin [A] and to test the resistance against the pressure.

The resistance against the pressure was tested by holding the bag for one minute with a load of 150 kg. Five bags were tested to judge if they were acceptable.

Adhesion to the Ny was the same as that of before being boiled for both 10 and 15 μm resin thick samples. None of the five bags were broken even after the pressure resistance testing, and favorable boiling resistance was obtained.

The results were as shown in Table 3.

Examples 6 and 7

Evaluation was made in the same manner as in Reference Example 3 but using the resin [4](Example 6) and the resin [6] (Example 7).

Like the resin [1], the resin [4] was free of problems concerning the adhesion to the Ny and the pressure resistance testing with both 10 μm and 15 μm samples, and exhibited favorable results.

The resin [6] exhibited a decrease in the adhesion to the Ny after boiled. However, none of the five bags were broken in the pressure resistance testing with both 10 and 15 μm.

The results were as shown in Table 3.

Comparative Example 5

Evaluation was made in the same manner as in Reference Example 3 but using the resin [7].

Adhesion to the Ny after the boiling was very poor with both 10 μm and 15 μm samples. In the pressure resistance testing, two bags were broken among five bags with 10 μm.

The results were as shown in Table 3.

TABLE 3

|  | Resin thickness, 10 μm | | | Resin thickness, 15 μm | | |
| --- | --- | --- | --- | --- | --- | --- |
|  | Adhesion to Ny, N/15 mm | | Pressure resistance testing | Adhesion to Ny, N/15 mm | | Pressure resistance testing |
|  | Before boiled | After boiled | | Before boiled | After boiled | |
| Ref. Ex. 3 (Resin [1]) | 3.2 | 3.2 | ○ | 3.1 | 3.8 | ○ |
| Example 6 (Resin [4]) | 3.4 | 3.3 | ○ | 3.0 | 3.3 | ○ |
| Example 7 (Resin [6]) | 2.5 | 0.8 | ○ | 2.6 | 2.0 | ○ |
| Comp. Ex. 5 (Resin [7]) | 1.5 | 0.2 | X | 2.1 | 0.3 | ○ |

Example 8

Laminates of the layer constitutions 1, 2 and 5 were prepared by using the resin [5] (resin to be evaluated) and were evaluated for their interlayer adhering strengths to the laminated base materials (PET, Al foil, OPP) and their workabilities.

However, the laminated samples of Example 8 were worked under the conditions different from those the laminated samples of Reference Examples 2 and 3, Examples 4 to 7 and Comparative Examples 2 to 5 with respect to two points; i.e., the resin temperature was 315 to 136° C. and the surface of the LDPE adhered on the PET base material was treated with corona (output of 6 kw).

The adhering strengths were measured by preparing the laminates using the resin to be evaluated with a thickness of 10 μm and after having left them to stand at 23° C. for 7 days.

Favorable adhering strengths practicable enough were obtained for various base materials.

The draw-down was 340 m/min. and the nick-in was 49 mm, which were properties without problem.

The results of the workabilities and the adhering strengths were as shown in Table 4.

Examples 9 and 10

Laminated samples were prepared in the same manner as in Example 8 but using the resin [9] (Example 9) and the resin [10] (Example 10) as the resins to be evaluated, and were evaluated for their adhering strengths to various base materials and workabilities.

The workabilities were quite without problem concerning DD and NI in both Examples 9 and 10.

The results were as shown in Table 4.

Comparative Example 6

The adhering strengths to various base materials and the workabilities were evaluated in the same manner as in Example 8 but using the resin [11].

The results were as shown in Table 4.

TABLE 4

|  | Adhering strength, N/15 mm, thickness of evaluated Resin: 10 μm | | | Workability | |
| --- | --- | --- | --- | --- | --- |
|  | PET | Al foil | OPP | Draw-down, m/min. | Neck-in, mm |
| Example 8 (Resin [5]) | 2.8# | 2.2 | 0.4 | 340 | 49 |
| Example 9 (Resin [9]) | 5.1* | 2.3 | 0.7 | 380 | 54 |
| Example 10 (Resin [10]) | 3.1# | 2.6 | 1.0 | 400< | 55 |
| Comp. Ex. 6 (Resin [11]) | 5.3 | 3.5 | 0.7 | 400< | 62 |

Peeling: Peeling: A mark # indicates that the base material (PET) was broken and a mark * indicates that the PE side was peeled.

Examples 11 and 12, and Reference Example 4

The purging property in the extrusion forming was evaluated in the same manner as in Reference Example 1 but using the resin [9] (Example 11), resin [10] (Example 12) and resin [11] (Reference Example 4).

The results were as shown in Table 5.

TABLE 5

| Resin | Appearance of molten film after extruding 25 kg of LDPE | Appearance of molten film after extruding 50 kg of LDPE | Appearance of molten film after extruding 75 kg of LDPE |
| --- | --- | --- | --- |
| Example 11 (resin [9]) | ○ | ○ | — |
| Example 12 (resin [10]) | ○ | ○ | — |
| Ref. Ex. 4 (resin [11]) | X | Δ | ○ |

Appearance of molten films:
○ Quite free of problem and favorable.
Δ Slight irregular feeling with scattering tiny lumps.
X Strong irregular feeling with many small lumps.
XX Very strong irregular feeling entirely crawling with large and small lumps.

It will be learned from Table 5 that the resin composition [11] without blended with the polyethylene (resin [3]) is poorly purged at the time of extrusion-molding, whereas the preferred resin compositions of the invention comprising the resins [1], [3] and [8] can be excellently purged. Further, it will be learned from the results of Table 4 that the resin compositions of the invention features excellent formability, workability and adhesiveness to the base materials.

The invention claimed is:

1. A resin composition consisting essentially of:
   at least one copolymer (A) selected from an ethylene/(meth)acrylic acid copolymer (A1) and an ethylene/(meth)acrylic acid/(meth)acrylic acid ester copolymer (A2); and
   a polyethylene (B),
   wherein when the total amount of (A) and (B) in the resin composition is set to be 100% by weight, the content of (A) is less than 100 to 46% by weight, the content of (B) is more than 0 to 54% by weight, and (A) contains 0.1 to 5% by weight of a (meth)acrylic acid unit.

2. The resin composition according to claim 1, wherein the content of (A) is 99 to 46% by weight and the content of (B) is 1 to 54% by weight per the total amount of (A) and (B).

3. The resin composition according to claim 2, wherein the content of (A) is 75 to 50% by weight and the content of (B) is 25 to 50% by weight per the total amount of (A) and (B).

4. The resin composition according to claim 1, wherein the copolymer (A2) contains the (meth)acrylic acid ester unit in an amount of 0.1 to 25% by weight.

5. The resin composition according to claim 1, wherein the copolymer (A1) or (A2) has a swelling ratio (SR) defined by the following formula (1) in a range of 40 to 65%, $$SR=(d_s-d_o)/d_o \times 100 \quad (1)$$

where $d_s$ is a diameter of a resin strand flowing out from a melt indexer under a load of 2160 g and at 190° C., and $d_o$ is a diameter of orifice of the melt indexer.

6. The resin composition according to claim 1, wherein the copolymer (A1) or (A2) has a melt flow rate (MFR: JIS K-7210-1999 (190° C., load of 2160 g)) in a range of 1 to 200 g/10 min.

7. The resin composition according to claim 5, wherein the copolymer (A1) or (A2) has a swelling ratio (SR) in a range of 40 to 65%, and has a melt flow rate (MFR) in a range of 1 to 40 g/10 min.

8. The resin composition according to claim 1, wherein the (meth)acrylic acid ester unit in the copolymer (A2) is an alkyl (meth)acrylate ester unit having 1 to 10 alkyl group carbon atoms.

9. The resin composition according to claim 1, wherein the polyethylene (B) is a low-density polyethylene having a density of 0.900 to 0.930 g/cm³.

10. A resin composition consisting essentially of:
    at least one copolymer (A) selected from an ethylene/(meth)acrylic acid copolymer (A1) and an ethylene/(meth)acrylic acid/(meth)acrylic acid ester copolymer (A2);
    a polyethylene (B); and
    an ethylene/(meth)acrylic acid ester copolymer (C) as a resin component, and
    when the total amount of (A), (B) and (C) is set to be 100% by weight, the content of (A) is less than 100 to 46% by weight, the content of (B) is more than 0 to 54% by weight, and the content of (C) is not larger than 40% by weight, and (A) contains 0.1 to 5% by weight of a (meth)acrylic acid unit.

11. The resin composition according to claim 10, wherein the content of (C) is 5 to 30% by weight per the total amount of (A), (B) and (C).

12. The resin composition according to claim 11, wherein the resin component comprises 50 to 75% by weight of (A), 1 to 40% by weight of (B) and 5 to 30% by weight of (C) (where (A)+(B)+(C)=100% by weight).

13. The resin composition according to claim 10, wherein (C) contains the (meth)acrylic acid ester unit in an amount of 1 to 35% by weight.

14. The resin composition according to claim 10, wherein the (meth)acrylic acid ester unit in (C) is an alkyl (meth)acrylate ester unit having 1 to 10 alkyl group carbon atoms.

15. A film or sheet obtained by molding a resin composition consisting essentially of at least one ethylene copolymer (A) selected from an ethylene/(meth)acrylic acid copolymer (A1) containing 0.1 to 5% by weight of a (meth)acrylic acid unit and an ethylene/(meth)acrylic acid/(meth)acrylic acid ester copolymer (A2) containing 0.1 to 5% by weight of the (meth)acrylic acid unit; and a polyethylene (B), the content of (A) being less than 100% by weight to 46% by weight and the content of (B) being more than 0 to 54% by weight.

16. A film or sheet obtained by molding a resin composition consisting essentially of at least one ethylene copolymer (A) selected from an ethylene(meth)acrylic acid copolymer (A1) containing 0.1 to 5% by weight of a (meth)acrylic acid unit and an ethylene/(meth)acrylic acid/(meth)acrylic acid ester copolymer (A2) containing 0.1 to 5% by weight of the (meth)acrylic acid unit; a polyethylene (B); and an ethylene/(meth)acrylic acid ester copolymer (C); and when the total amount of (A), (B) and (C) is set to be 100% by weight, the content of (A) is less than 100% by weight to 46% by weight, the content of (B) is more than 0 to 54% by weight, and the content of (C) is not more than 40% by weight.

17. A laminate obtained by laminating at least a layer of the film or the sheet of claim 15.

18. A laminate obtained by extrusion laminating, on a substrate, a resin composition consisting essentially of at least a copolymer (A) selected from an ethylene/(meth)acrylic acid copolymer (A1) which contains 0.1 to 5% by weight of a (meth)acrylic acid unit and an ethylene/(meth)acrylic acid/(meth)acrylic acid ester copolymer (A2) which contains 0.1 to 5% by weight of the (meth)acrylic acid unit; and a polyethylene (B), the content of (A) being less than 100% by weight to 46% by weight, and the content of (B) being more than 0 to 54% by weight.

19. A laminate obtained by extrusion laminating, on a substrate, a resin composition consisting essentially of at least a copolymer (A) selected from an ethylene/(meth)acrylic acid copolymer (A1) which contains 0.1 to 5% by weight of a (meth)acrylic acid unit and an ethylene/(meth)acrylic acid/(meth)acrylic acid ester copolymer (A2) which contains 0.1 to 5% by weight of the (meth)acrylic acid unit; a polyethylene (B); and an ethylene/(meth)acrylic acid ester copolymer (C); and when the total amount of (A), (B) and (C) is set to be 100% by weight, the content of (A) is less than 100% by weight to 46% by weight, the content of (B) is more than 0 to 54% by weight, and the content of (C) is not more than 40% by weight.

* * * * *